(12) United States Patent
Gutierrez

(10) Patent No.: US 11,624,463 B2
(45) Date of Patent: Apr. 11, 2023

(54) DOUBLE BALL BIAXIAL PIPE COUPLING

(71) Applicant: Shannon Gutierrez, Livermore, CA (US)

(72) Inventor: Shannon Gutierrez, Livermore, CA (US)

( * ) Notice: Subject to any disclaimer, the term of this patent is extended or adjusted under 35 U.S.C. 154(b) by 417 days.

(21) Appl. No.: 16/423,124

(22) Filed: May 27, 2019

(65) Prior Publication Data

US 2020/0378535 A1 Dec. 3, 2020

(51) Int. Cl.
  *F16L 27/047* (2006.01)
  *F16L 27/073* (2006.01)

(52) U.S. Cl.
  CPC .......... *F16L 27/047* (2013.01); *F16L 27/073* (2013.01)

(58) Field of Classification Search
  CPC ....... F16L 27/026; F16L 27/04; F16L 27/047; F16L 27/073; F16L 27/96
  USPC ........................ 285/146.1, 146.2, 146.3, 261
  See application file for complete search history.

(56) References Cited

U.S. PATENT DOCUMENTS

| | | | | |
|---|---|---|---|---|
| 1,665,810 A * | 4/1928 | Gillick | ........................ | 285/146.1 |
| 1,914,736 A * | 6/1933 | Coutu | ..................... | F16L 27/04 |
| 1,925,335 A * | 9/1933 | Murphy | ................... | F16L 27/06 |
| | | | | 285/146.1 |
| 3,848,899 A * | 11/1974 | Smith | ..................... | F16L 27/04 |
| | | | | 285/146.3 |
| 5,409,269 A * | 4/1995 | Karlsson | ..................... | 285/146.1 |
| 2013/0168957 A1* | 7/2013 | Kaplan | ................... | F16L 27/04 |
| | | | | 285/146.1 |

* cited by examiner

*Primary Examiner* — Zachary T Dragicevich

(57) ABSTRACT

A double ball pipe coupling with two axes for connecting fluid pipes or conduits at eccentric angles while reducing or eliminating frictions loss. The coupling also provides movement of pipes or fluid pathways that are under low to high pressures. Two outer shell halves contain two ball joints with protruding connections and or outer fittings for most applications. The shell halves being mostly uniform or oblong or distorted for highly non-collinear connections. The ball joints containing pathways rotate within each shell half while permitting fluid flow as intended while greatly reducing restrictions.

3 Claims, 7 Drawing Sheets

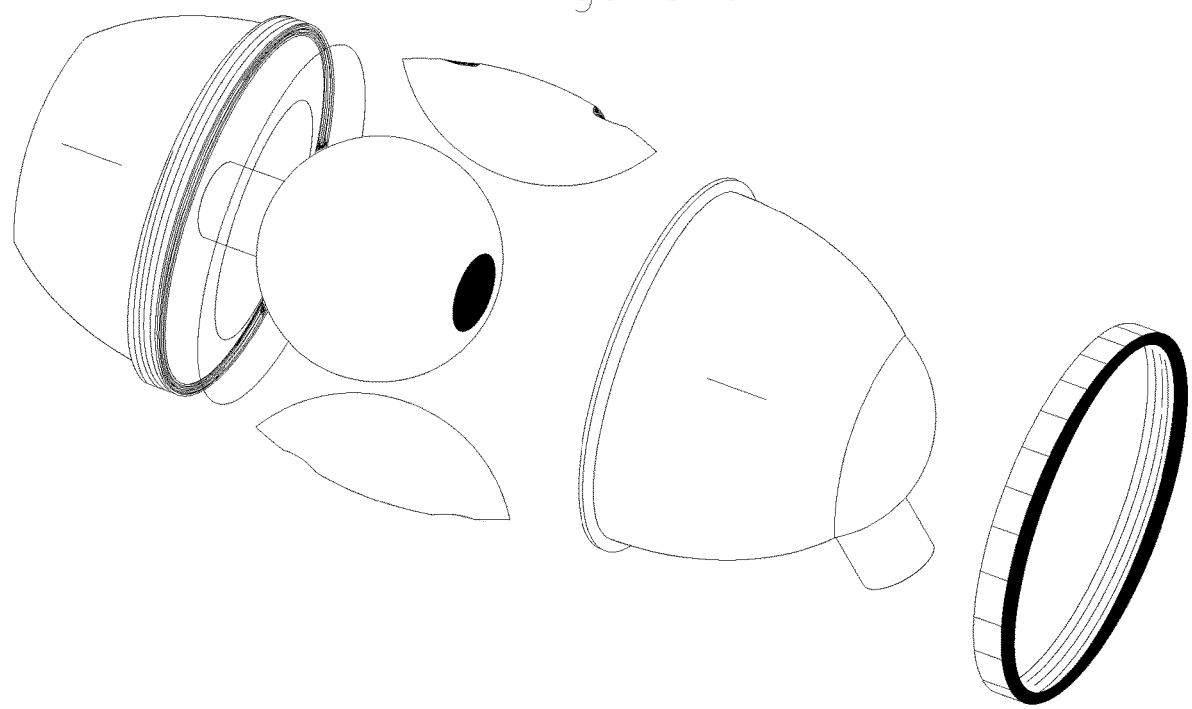

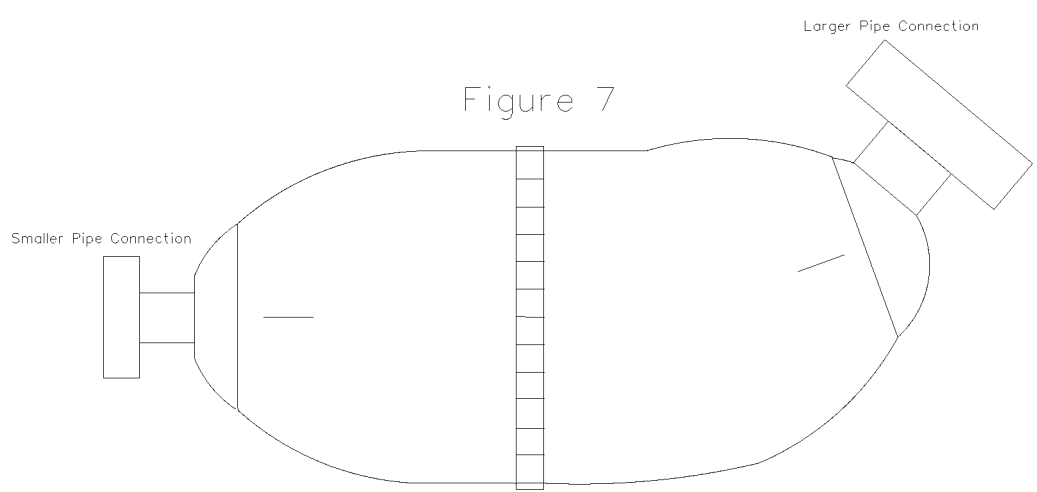

DOUBLE BALL BIAXIAL PIPE COUPLING

BACKGROUND OF THE INVENTION

Pipe couplings and pipe joints have been used for many years to allow the connection of various piping at various angles. Pipe couplings and joints can have varying degrees of construction for a multitude of applications. Most notably are common fixed-angle pipe joints ranging from 22.5 degrees, 45 degrees, and 90 degrees. Common pipe joints can be used to satisfy most applications where there is enough space, time, and pipe movement. Common fixed-angle pipe joints usually require ample experience when affixing joints of two piping conduits to obtain appropriate alignment. Disadvantages and problems associated with fixed angle joints arise when pipes movement is non-existent or very limited, when glue setting becomes problematic, and when setting correct angles requires exhaustive work.

Other types of joints for connecting pipes of varying angles include flexible pipe, swivel joints, and eccentric joints. Flexible pipe connectors allow for easier connection of two pipes or connections that are at odd angles and limited space. Flexible pipe connectors may be constructed of several types of material for specific applications. Problems with flexible pipe connectors are that stronger construction types such as stainless steel are limited in flexibility and may break if flexed beyond design limits. Flexible connectors of weaker material allow greater flexibility but may not withstand high pressures of a fluid distribution system. Swivel joints have several types of designs and construction material and are useful for piping segments of different angels. Swivel joints usually move from 0 degrees to approximately 30 degrees for joining pipes. Swivel joints require the addition of a threaded two piece union. Eccentric joints are limited in that there is no flexion; however, they can be used to connect pipes on the same horizontal plane with little horizontal or vertical offset. Eccentric joints can be used in combination with fixed angle joint connectors to reach desired angled pipe connections if enough space and time exist.

The closest resemblance to the claims herein this invention is the FLEX-TEND® flexible expansion joints. The FLEX-TEND®, is available in single or double ball configurations within sockets; however, the major differences that the FLEX-TEND® product possesses to the claims herein this invention are: (1) The ball joints are secured within a single socket. (2) Flexion is more limited and therefore connection of eccentric pipe pathways is more limited. (3) Pipe connections are of one type. (4) In order to absorb motion, it must be restrained to the adjacent piping.

Other resemblances to the claims herein are flexible ball joints, which may also be referred to as swivel joints. A flexible ball joint acts very similar to the claims of this invention but is different in concept and design and thereby limited in flexion. A flexible ball joint may be designed in so that it has a connecting ring whereby each end can be affixed to open pipe ends first then joined by threaded outer ring. Most ball or swivel joints are of one-ball design thereby limiting flexion before fluid flow restrictions occur.

In certain applications it is necessary to have a quick pipe joint that will exceed the limitations of conventional joints without cutting pipe or without removing certain components to gain correct angles. In some instances a critical component such as an expensive valve must retain its position and there is no available time, resources, or space to reconstruct fluid pipe conduits and appurtenances. Additionally, some locations, services, or distributions require fluid pipe pathways be subterranean, aerial, or subaqueous having deflection capabilities.

It is therefore an object of the present invention to provide a pipe coupling for selective multi-angular and/or multi-axial connection of high and low pressure fluid pipe conduits of non-collinear paths that allows for deflection. It is a further object to provide a pipe coupling that reduces or eliminates friction loss without affecting fluid flow conditions within a selected placement or setting of pipe conduits having static or dynamic environmental forces.

SUMMARY OF THE INVENTION

The problems or limitations associated with existing devices for connection of two pipe extension pathways at eccentric angles in difficult circumstances are overcome by the present invention. The present invention includes an oval-shaped outer shell and two ball-shaped joints therein. The ball joints combined and positioned within a shell allow for greater degrees of flexibility under eccentric pipe segmented angles without restricting fluid flow or volume. The present invention also allows for limited flexion or movement under dynamic pipe conditions such as during pressurized flow or under vacuum.

The two shells have hollow openings with pathways to receive moveable and replaceable inner ball joints, which adjust to the outer limits of the shell mold. Coupling flexion does not limit fluid pathways when shell is positioned in-line with maximum degree fluid flow as provided on outer member indicator marks. Flexion does limit fluid pathway to a small degree when positioned and adjusted outside of indicator marks; however, indicator marks provide the position of the ball joint back stops thereby allowing maximum degree of movement without fluid pathway restriction. In some instances outer limit positioning may be desirable for flow modulation.

Pressurized fluid flow through the double ball joint creates forces against the internal component surfaces. This force is a driving power for separation that can improve outer ring sealing; however, higher pressures will effect movement under these conditions. Movement under dynamic pipe fluid pressure conditions in, repeated "hammering" will affect the present invention like most other fluid pathways and connections.

BRIEF DESCRIPTION OF THE FIGURES

Reference is made to the following brief description of embodiments that reference drawings provided in which:

FIG. 6. This is an exploded perspective view of FIG. 1 as disassembled. Sealing rings are displayed behind the exposed left ball joint, the outer shell halves are apart, the retaining stops are outside the shells, the right ball joint remains in the right shell half, and the locking ring is shown off to the right.

FIG. 7. This is an example of a possible polymorph of the embodiment for unique applications.

DETAILED DESCRIPTION

Figure 1:
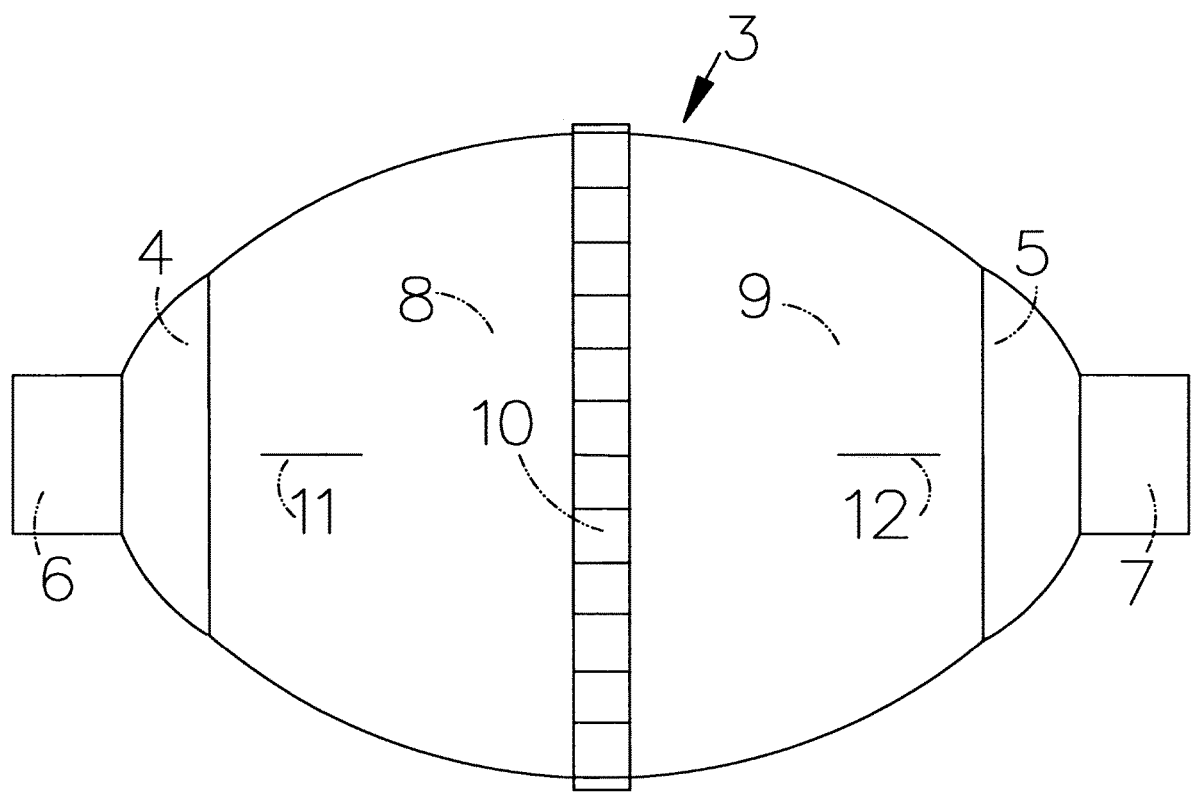
FIG. 1. This is a side view from left or right, which could also be top or bottom if viewed perpendicular to the horizontal plane of the inlet and outlet connections.

FIG. 1. A pipe coupling for connection of two eccentric, parallel, or straight pipe extension pathways that also prevent axial separation. The coupling includes an oval-shaped outer shell housing 3 and two ball-shaped inner components or joints 4-5. The two ball-shaped joint components have connectable pipe extensions for pipe ends 6-7, which may be threaded, slip or socket, or any connectable configuration. The outer shell housing has two nearly identical halves 8-9, which are joined by means of sealable threaded connection with a locking ring 10. One shell acts as a sealing member and the other a retaining member. The two shells having hollow openings with pathways to receive rotatable inner ball joints, which adjust to the smaller outer openings and limits of each shell mold half. Coupling flexion does not restrict fluid flow within pathways when pipe ends are positioned in-line or horizontal with all four outer shell "Max Flow" indicator marks 11-12. Coupling flexion does not restrict fluid flow within pathways when pipe ends are angled in multiple degrees and directions while maintaining horizontal alignment with indicator marks. Flexion does create minor friction loss when pipe ends are angled against indicator marks; however, axial rotation of the outer shell in certain cases would reduce fluid restriction caused by the retaining stops FIG. 3. 32-33. Indicator marks are provided on both sides and are molded or etched perpendicular to the center of retaining stops. The length and size of indicators marks are sized relative to various coupling sizes.

Figure 2:
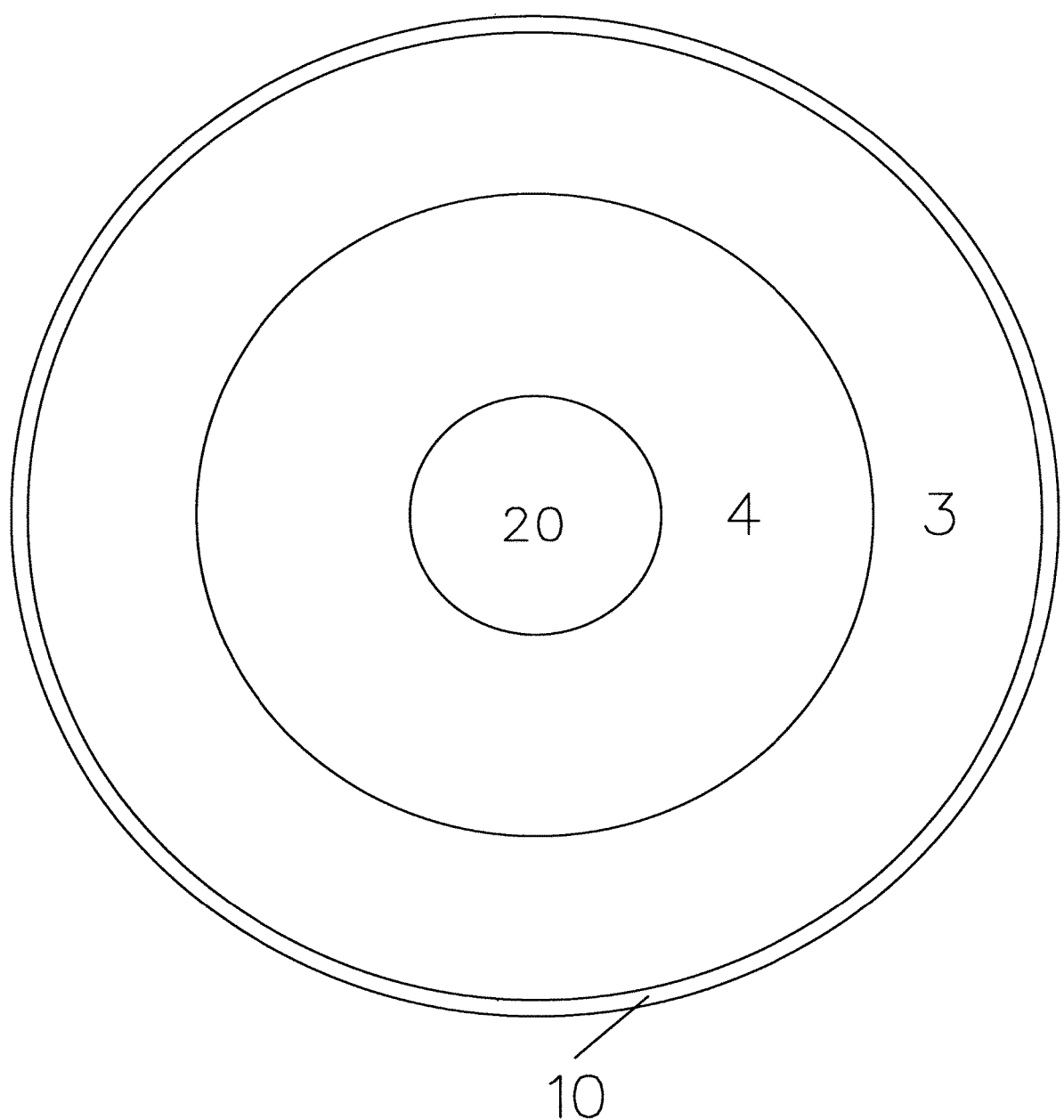
FIG. 2. This is an inlet/outlet view also referred to as front or back.

FIG. 2. The connectible pipe extension and the pathway therein 20 rotates with the ball joint 4 in various directions. The extent of movement is limited to the shell housing 3 diameter. The outer locking ring 10 provides a means for locking the two shell halves together into one shell housing.

Figure 3:
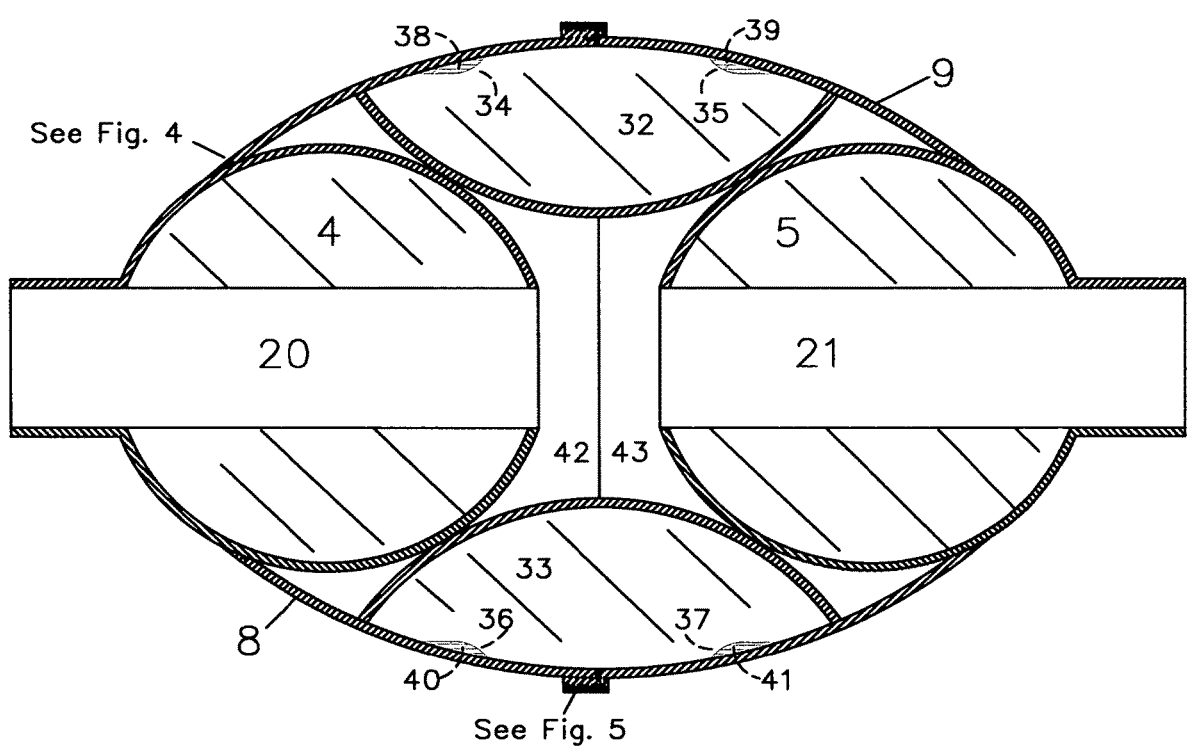
FIG. 3. This is a cross-sectional view of FIG. 1 of the outer shell, ball joints, and backstops as if assembled and completely divided equally in half.

FIG. 3. Each outer shell half 8-9 is shaped identically inside where the inner ball joints 4-5 fit thereinto and compress against two elliptical-shaped inner retaining stops 32-33. Said stops are smooth to allow ball joint movement. Retaining stops are inserted during coupling assembly, directly opposing each other, and held into position by the mating sockets 34-37. Said mating sockets being mostly concave and allowing for the straight insertion and acceptance of retaining knobs 38-41. Said knobs protrude outwardly from inner surface of each shell housing. Said knobs being molded or milled together with shell housing or affixed by chemical adhesion. The shell halves are joined symmetrically 42-43 after said retaining stops are inserted. The hallow fluid pathway 20-21 is depicted in the straight position in which friction loss would be at a minimum. The distance between said ball joints, and overall length of embodiment, will vary with a combination of varying sizes of the ball joints and fluid pathway and size and shape of the retaining stops. See FIGS. 4 and 5 for a detailed description of sealing and locking surfaces.

Figure 4:
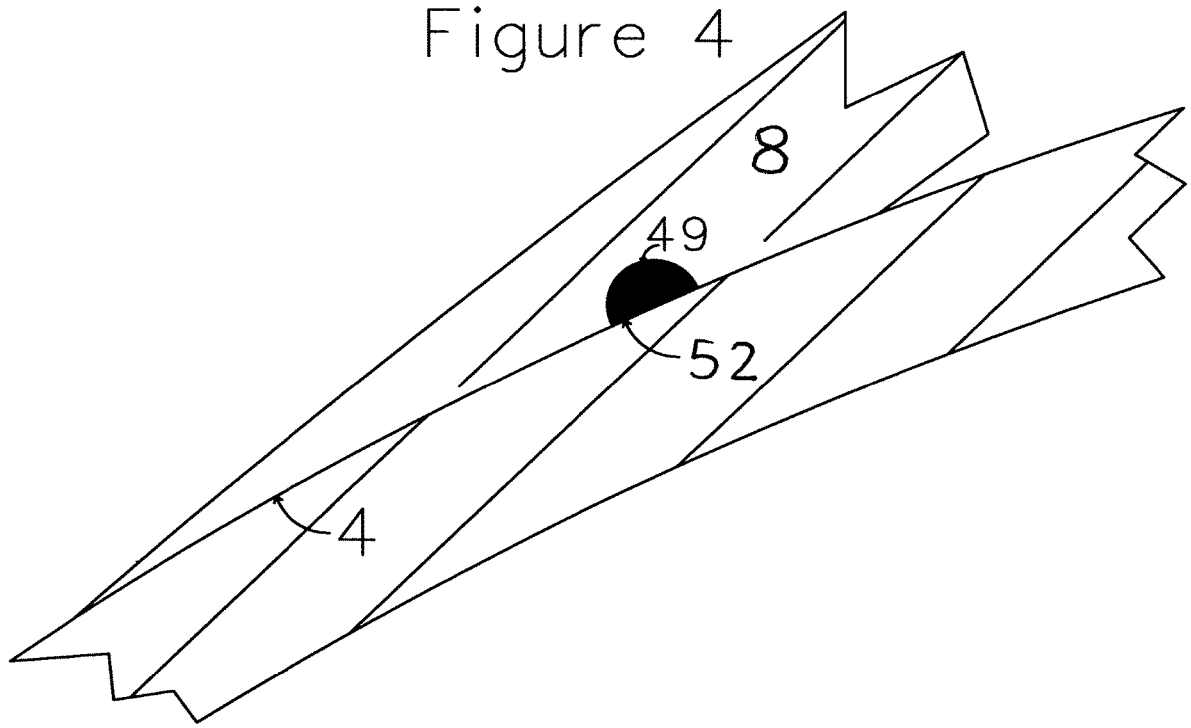
FIG. 4. This is a cross-sectional closeup of the sealing ring 48 between one outer shell half and one inner ball joint.

FIG. 4. The outer surface of ball joint 4 is sealed against the shell mold half 8 by way of sealing ring 52. For the purpose of this description an O-ring seal is used, but other sealing materials and shapes may be used as provided in the claims section. When the two shell halves are connected together, pressure is applied to the seal from the ball joints by both tightening of the shell halves and by static or dynamic fluid pressure. Semicircular grooves 49 facing radially inward allow acceptance and fitting of sealing rings. Movement of the joints after shell abutting is permissible given that the locking ring is not overly tightened.

Figure 5:
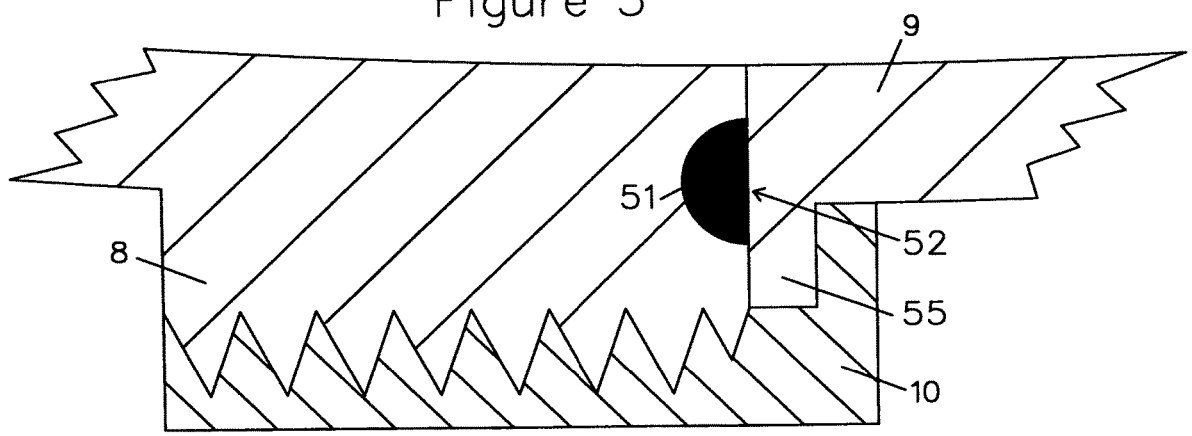
FIG. 5. This is a single closeup cross-sectional view of locking surfaces of the outer shell halves. Shell halves 8-9 are secured together by the outer ring 53.

FIG. 5. The mating surfaces are sealable as described. The sealing mating surface of shell half 8 has an annular-shaped channel having a semicircular groove 51 facing radially inward for accepting a replaceable O-ring 52. The sealing mating surface on the opposing shell 9 is flat and smooth for O-ring compression and sealing. Shell half 8 has male threading on the outer largest diameter for accepting a lockable ring 10. The opposing shell 9 with the flat annular-shaped mating surface has a molded lip 55 thereby providing an edge to keep both shells together with the threaded locking ring 10. The movable threaded locking ring inner surface has female threads for fastening to the male threads of shell half 8. The locking ring outside surface having grooves or no grooves to provide grip or no grip respectively. Once the two shells are joined, the locking ring is threaded onto and tightened for O-ring 52 compression and thereby sealing. Threading roles or design can be reversed such as having male threads on the O-ring shell thereby having the locking ring on the opposite shell.

FIG. 6. Each inner ball-shaped joint with pipe extension is of identical shape and therefore interchangeable. Each shell frustum having openings larger than the pipe connector ends allowing for ball joint insertion, ball joint movement, and fluid flow in several fluid pathway angles while preventing friction loss. Hollow fluid pathways allow for maximum flow.

FIG. 7. Each member coupling shell half can be several lengths for varying applications and degrees of use. For example, one shell half may be of a particular size while the opposing is three times the length and or curved. The hollow of each ball joint is sized to allow desired diameter of pipe. The pipe connecting end could be straight, straight with male or female nipples, threaded, or a combination thereof. These embodiments allow for a multitude of connecting pipe segments and other fittings. The variations recognized may be made therein while keeping with the invention as provided in the claims.

The invention claimed is:

1. A unitary double ball pipe coupling comprising:
an oval body having a static hollow longitudinal axis, first and second ball joint members extending into opposite socket ends of the oval body, wherein the oval body comprises a first shell half and a second shell half; wherein, each shell half having a socket cavity and a larger circular flange extending axially outward from a smaller circular end, said smaller circular end being truncated and having a diameter smaller than the flange, each shell half having diametrically opposed internal oval retaining knobs protruding inwardly into the socket cavity of said shell half serving to accept and retain backstops, each shell half having semicircular grooves internally and annular near the smaller circular end of said shell half to accept a seal;
said second shell half having an externally threaded flange; said first shell half having a first outer indicator mark; said second shell half having a second indicator mark; said first and second indicator marks being diametrically opposed and radially located ninety degrees from center of said inner backstops indicating the maximum allowable degree of fluid flow across eccentric pathways;
a singular setting ring to engage and lock the first and second shell halves, said ring fitting over a rearward side of the first shell half and threading onto the second shell half threaded flange, said ring being free-standing while not engaged.

2. The unitary double ball pipe coupling of claim 1, wherein said ball joint members have identical cylindrically hollow configurations with hollow longitudinal pipe ends extending the fluid pathway beyond each shell half smaller truncated ends, said ball joints rotatably mounted within each said shell half socket cavity with annular abutment to said seals and backstops.

3. The unitary double ball pipe coupling of claim 1, wherein said backstops are elongated semi-circular shapes, said backstops bearing against said ball joint members.

\* \* \* \* \*